United States Patent [19]

Cadaureille et al.

[11] Patent Number: 4,720,369
[45] Date of Patent: Jan. 19, 1988

[54] DEVICE FOR CLEANING THE GUIDE TUBES OF THE MEANS OF MEASURING NEUTRON FLUXES IN A PRESSURIZED-WATER NUCLEAR REACTOR

[75] Inventors: Gerard Cadaureille, St. Laurent de Mures; Patrick Cresson, Lyons; Claude Vecchionacci, Chalon-sur-Saone, all of France

[73] Assignee: Framatome, Courbevoie, France

[21] Appl. No.: 795,596

[22] Filed: Nov. 6, 1985

[30] Foreign Application Priority Data

Nov. 13, 1984 [FR] France .................. 84 17311

[51] Int. Cl.⁴ .................. G21C 17/08; G21C 19/00
[52] U.S. Cl. .................. 376/248; 376/249; 376/310; 376/313; 134/169 C
[58] Field of Search .......... 376/310, 313, 260, 248, 376/249; 134/169 C, 166 C

[56] References Cited

U.S. PATENT DOCUMENTS

| | | | |
|---|---|---|---|
| 4,309,583 | 1/1982 | Krauss et al. | 376/260 X |
| 4,313,793 | 2/1982 | Klumb et al. | 376/260 |
| 4,483,205 | 11/1984 | Bellaiche et al. | 376/310 X |

FOREIGN PATENT DOCUMENTS

| | | | |
|---|---|---|---|
| 3434051 | 3/1986 | Fed. Rep. of Germany | 376/249 |
| 2081077 | 12/1971 | France . | |
| 2483671 | 12/1981 | France . | |
| 2542126 | 9/1984 | France . | |

Primary Examiner—Teddy S. Gron
Assistant Examiner—John S. Maples
Attorney, Agent, or Firm—Pollock, Vande Sande & Priddy

[57] ABSTRACT

Device for cleaning the instrumentation guide tubes (5) of a pressurized-water nuclear reactor, comprising a pump (18) for injecting demineralized water under pressure into the tubes (5) and an assembly (15, 20, 21, 22) for recovering the radioactive waste. The assembly (15) can take up a position above each of the passages (7) located in the vessel bottom (2) and through which the guide tubes (5) open into the vessel (1). The assembly is put in place at the end of each of the passages (7) in succession, without the need to remove the lower internal equipment (9, 40) of the reactor. All operations are controlled from the platform (17) of the reactor fuelling machine. The invention is used for the maintenance of pressurized-water nuclear reactors during refuelling.

4 Claims, 18 Drawing Figures

DEVICE FOR CLEANING THE GUIDE TUBES OF THE MEANS OF MEASURING NEUTRON FLUXES IN A PRESSURIZED-WATER NUCLEAR REACTOR

FIELD OF THE INVENTION

The invention relates to a device for cleaning the guide tubes of the means of measuring neutron fluxes in a pressurized-water nuclear reactor.

BACKGROUND OF THE INVENTION

Pressurized-water nuclear reactors have a core formed of prism-shaped assemblies arranged vertically and resting on a support plate within the vessel of the nuclear reactor.

During the operation of the nuclear reactor, it is necessary periodically to carry out flux measurements within the actual interior of the core. For this purpose, very small fission detectors are used, and these are displaced by remote control, by means of teleflex cables, within tubes closed at one of their ends and called glove fingers. The glove fingers are introduced according to a predetermined distribution into the entire height of some core assemblies after passing inside instrumentation tubes. As a result of the displacement of the flux detectors within the glove fingers introduced into the assemblies, flux measurements can be carried out over the entire height of the core. It must be possible to extract the glove fingers from the core assemblies, for example to make it easier to carry out the operations of refuelling the reactor core; for this purpose, a pull is exerted on the end of the glove fingers from an instrumentation room located laterally in relation to the well of the reactor vessel. The glove fingers are arranged in guide tubes, one of the ends of which opens into the instrumentation room and the other end of which opens into the inner volume of the vessel by means of a vertical sleeve passing through the convex vessel bottom. Between these two ends, the guide tube has a bent part with a relatively large radius of curvature.

The lower internal equipment of the reactor comprises, in addition to the plate which supports the core and on which the assemblies rest, the shell and the partitioning of the core and a set of elements arranged between the core support plate and the lower convex bottom of the vessel and comprising, in particular, hollow instrumentation guide columns, the bore of which is an extension of the bore of the guide-tube passage sleeves. The central duct of these guide columns opens onto the upper face of the core support plate in alignment with an instrumentation tube of an assembly resting on the support plate.

The inside diameter of the guide tubes, the guide columns and the instrumentation tubes of the assemblies is such that there is sufficient play between the glove finger and its guide duct. It is therefore easy to maneuver the glove fingers by pulling and pushing them respectively to extract them from the core over the entire height of the latter (i.e., over a length in the region of 4 metres) and to reintroduce them into the core.

However, it was noted that, after the reactor had been in operation for a certain length of time, the force needed to extract the glove fingers, and above all the force needed to reinsert them, increased substantially.

For example, the glove-finger insertion force which is 100 to 150 newtons on a reactor at the time of commissioning increases to a value of 400 to 500 newtons after the second refuelling. This increase in the glove-finger insertion force could be attributed to the presence of solid particles which were deposited between the glove finger and the inner wall of the guide tube, especially in the vicinity of the bend of this guide tube. In fact, the glove fingers, during their displacement, cause an accumulation of particles in the region of the bend and make it easier for them to settle.

A process for cleaning the guide tubes at the time of the operations of refuelling the reactor core was therefore proposed. In this case, the vessel is open in its upper part and in communication with the reactor pool, the assembly as a whole being filled with water. To carry out the cleaning process, means are provided for injecting demineralized water under pressure into the guide tubes via their end opening into the instrumentation room.

However, it is necessary to recover this demineralized water and the particles which it contains in suspension at the other end of the guide tubes.

In nuclear reactors in operation at the present time, there are 50 guide tubes passing through the convex bottom of the vessel by means of 50 sleeves distributed uniformly over this convex bottom and arranged underneath the lower internal equipment of the reactor. The sleeves themselves open with substantial play into the bore of the lower part of the guide columns forming part of the lower internal equipment.

It is therefore necessary to recover the demineralized cleaning water, containing the particles which are radioactive, at the outlet of the passage sleeves. To gain access to these sleeves, the lower internal equipment is therefore removed and extracted from the vessel, the upper internal equipment and the core assemblies having been extracted beforehand.

Means of recovering the water and the radioactive particles are brought sucessively into place on the end of each of the sleeves during the injection of pressurized water into the corresponding guide tube.

These means are put in place from the platform of the fuelling machine, above the reactor pool, by means of a very long pole which carries in its lower part a camera making it possible to display the operations of installing the recovery means. These means comprise a cylindrical cap provided on the inside with a gasket of a diameter corresponding to the diameter of the sleeve, a flexible tube which communicates with the inner volume of the cylindrical cap and on which is located a valve controlled by a linkage from the platform, and a filtration unit at which the flexible tube terminates above the level of the reactor pool.

It is difficult to carry out these operations, the control of which via a camera fixed to the lower end of the pole can only be obtained under very good conditions.

Furthermore, to carry out this process, it is necessary to extract the lower internal equipment from the vessel and therefore to reinstall it after the operation. The operation of extracting and the operation of reinstalling the lower internal equipment creates considerable risks.

SUMMARY OF THE INVENTION

The aim of the invention is therefore to propose a device for cleaning the guide tubes of the means of measuring neutron flux in a pressurized-water nuclear reactor at shutdown, the said reactor comprising a vessel containing internal equipment supporting and retaining the fuel assemblies of the core or lower internal equipment arranged above the convex bottom of the vessel and comprising, in particular, a horizontal core support plate, a reactor pool communicating with the inner volume of the vessel, the assembly as a whole being filled with water, a fuelling machine movable above the reactor pool in a horizontal plane and comprising, in particular, a platform and a winch for handling in the vertical direction, capable of coming into vertical alignment with all the points on the vessel bottom, a containment containing the reactor pool and the vessel within a vessel well, and an instrumentation room which is arranged laterally in relation to the vessel well and into which enters one of the ends of the guide tubes, each connecting the instrumentation room along a path incorporating a bend to the inner volume of the vessel, into which the guide tube opens via a vertical sleeve passing through the vessel bottom, in alignment with a guide column, the central guide duct of which opens onto the upper face of the core support plate at the level of a passage corresponding to a position of entry of the flux-measuring means into an assembly, the cleaning device comprising means of injecting demineralized water into each of the guide tubes located in the instrumentation room and means of recovering the water laden with radioactive particles at the outlet of the vertical sleeve, comprising a flexible tube connected to a filtration station Located above the fuel pool, this cleaning device making it possible to carry out much more simply and much more reliably the operations of installing it an putting it to use.

For this purpose, in order to install them and recover the radioactive particles without extracting the internal equipment from the reactor vessel, from which only the upper internal equipment and the core assemblies have been extracted, the recovery means comprise:

a hollow structural beam suspended vertically via its upper part from the handling winch by means of a suspension element, on which the beam is mounted so as to be rotatable about its vertical axis, a fastening plate mounted on the lower end of the beam, rotatable about the axis of this beam and having positioning means intended for interacting with positioning means corresponding to an assembly provided on the core support plate and means of locking the beam in fixed angular positions on the plate, a first housing mounted so as to be movable in the hollow beam in its axial direction and carrying a hollow needle with a point axially offset at its lower end, the said needle being provided with deformable gaskets on its outer surface, and a three-way valve, one channel of which communicates with the inner space of the needle, a second channel of which communicates with the flexible tube and the third channel of which is an extension of the first, a second housing carrying a light source, a fibroscope, a television camera and a device for applying voltage to the fibroscope and which is movable axially in the first housing above the three-way valve, two winches controlling the axial displacement of the housings, each associated with a housing and fastened to the platform of the fuelling machine by means of a support, in which the beam is mounted so as to be rotatable about its vertical axis, and display and control means located on the platform of the fuelling machine for the controlled insertion of the needle into the bore of the sleeve.

BRIEF DESCRIPTION OF THE DRAWINGS

To make the invention more comprehensible, an embodiment of the cleaning device according to the invention, which can be used in a pressurized-water nuclear reactor of a type in operation at the present time and with a power of 900 or 1,300 MW, will now be described with reference to the attached drawings, in which.

DETAILED DESCRIPTION

Figure 1:
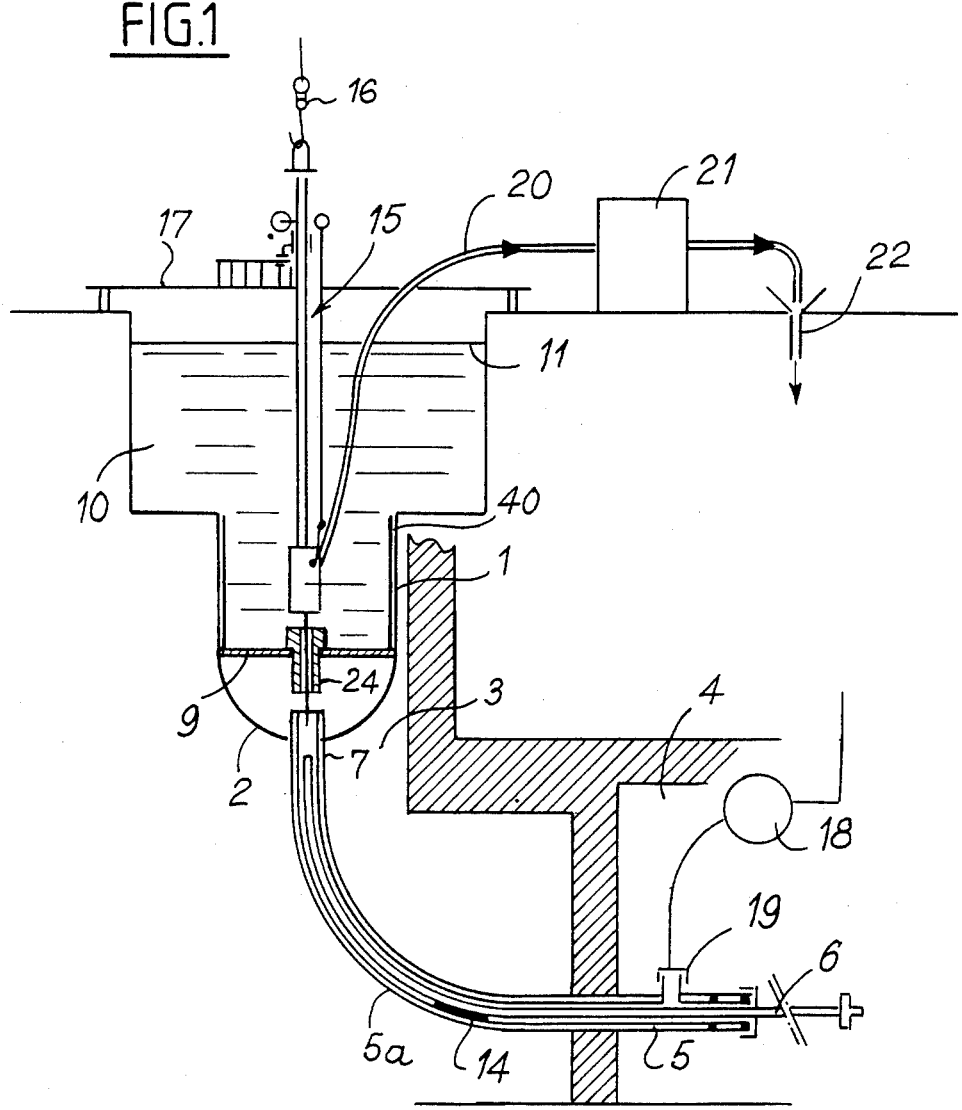
FIG. 1 is a highly diagrammatic view of the device used to clean a guide tube.

FIG. 1 shows in a highly diagrammatic way the cleaning device in its position of use in the vessel of the nuclear reactor. The vessel 1, of which the lower part having a convex bottom 2 is shown, is arranged in a vessel well 3 forming part of the structure of the reactor containment. Laterally in relation to the vessel well 3 there is an instrumentation room 4, into which the instrumentation guide tubes 5 enter via orifices in its concrete wall. FIG. 1 shows a tube 5 which has been widened considerably in the diametral direction to show the structure of this tube and the instrumentation which it contains.

Nuclear reactors in operation at the present time use an assembly comprising approximately 50 guide tubes, such as the tube 5 which makes it possible to guide a glove finger 6 to insert it into the core or to extract it. To measure neutron flux, a miniature detector can be displaced by means of a teleflex system inside the glove finger 6, which is itself introduced into an instrumentation tube of a fuel assembly of the core.

The guide tube 5 has a bend 5a with a large radius of curvature, to make the glove finger 6 change from a horizontal path in the instrumentation room 4 to a vertical path in the vessel of the nuclear reactor. The glove fingers can be moved in the guide tube by being pushed or pulled from the room 4.

The guide tubes 5 pass through the lower convex bottom 2 of the vessel 1 by means of vertical sleeves, such as 7.

Located in the vessel, above the convex bottom 2, is a lower core support plate 9, on which the assemblies come to rest by means of their lower end.

The cleaning of the guide tubes 5, as illustrated in FIG. 1, is carried out during the operations of refuelling the core, the reactor vessel being open in its upper part and in communication with the pool 10, the vessel 1 and the pool 10 both being filled with water up to the level 11. The upper internal equipment of the reactor arranged above the core and the core itself have been extracted from the vessel.

In contrast, the lower internal equipment comprising, in particular, the core support plate 9 has remained in the vessel. The device 15, illustrated in a highly diagrammatic way in FIG. 1, in fact makes it possible, as will be explained below, to carry out the cleaning operation with the lower internal equipment in place.

The device 15 is suspended from a handling winch 16 which can be associated with the fuelling machine, the platform 17 of which is used for the lateral retention and control of the device 15.

During the operation of the reactor, solid particles, such as particles of oxide or metal 14, are deposited between the glove finger 6 and the inner surface of the guide tube 5 in the zone 5a of the bend of this guide tube.

Prior to the extraction of the assemblies of the core, during the refuelling operations, the glove fingers 6 have been extracted from these assemblies by being pulled from the room 4, as illustrated in FIG. 1. The closed upper end of the glove fingers is then at a level below the level of the vessel bottom through which the sleeve 7 passes. The displacements of the glove fingers 6 in the guide tubes 5 cause the particles 14 to accumulate and settle in the zone of the bend, with the result that, when the glove fingers 6 are to be reintroduced into the assemblies after the refuelling of the core, the force to be exerted on these glove fingers can become excessive.

The cleaning operation using the tool shown highly diagrammatically in FIG. 1 is intended to eliminate the particles 14 by injecting demineralized water under pressure by means of a pump 18 located in the room 4 and injecting water into a branch 19 provided at the end of the guide tube 5 inside the room 4. A rapid-coupling system makes it possible to connect this pump and then inject the demineralized water into each of the 50 guide tubes 5 in succession.

Before demineralized water is injected under pressure into a guide tube 5, the device 15 is brought into vertical alignment with this tube, so that the means of recovering the liquid waste containing solid particles 14 can ensure that this waste containing radioactive particles is transferred by means of a flexible tube 20 to a filtration station 21 and from there to a liquid-waste elimination circuit 22.

Figure 2:
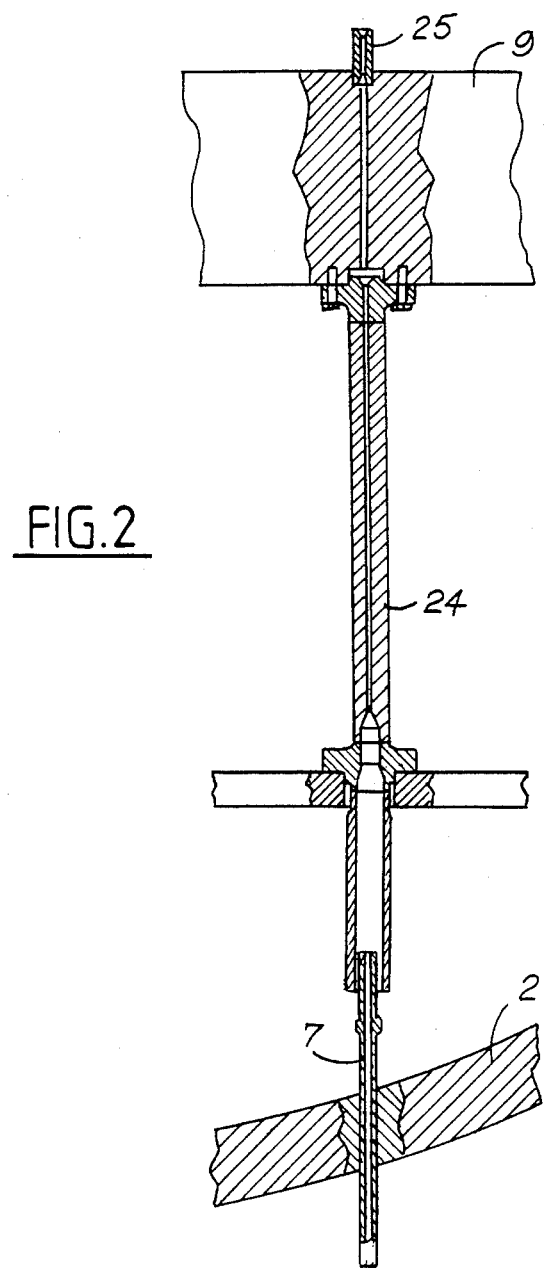
FIG. 2 is a vertical sectional view through a passage sleeve for a guide tube and upper internal equipment located above this sleeve.

FIG. 2 shows the vessel bottom 2, through which passes a sleeve 7 constituting the vessel entry end of an instrumentation guide tube 5. The upper end of this sleeve 7 opens into a vertical guide column 24 forming part of the lower internal equipment of the reactor and fastened to the lower face of the core support plate 9. Above the lower core plate 9, a guide piece 25 makes it possible to guide the glove finger 6, when it is reintroduced into the core, in the instrumentation guide tube of the corresponding assembly which comes into position on the plate 9 in vertical alignment with the column 24.

It will be seen in FIG. 2 that the effluent containing the radioactive particles has to be recovered actually inside the sleeve 7 in its upper part, since this sleeve opens with moderately substantial play into the guide column 24 of the lower internal equipment. Moreover, there can be a more or less large offset of the sleeve within the bore of the column 24 in its lower part.

The device 15, which will be described in detail with reference to FIGS. 3 to 6, makes it possible to position at a distance and with a high degree of safety a tool for recovering the effluent inside the sleeve 7.

Figure 3:
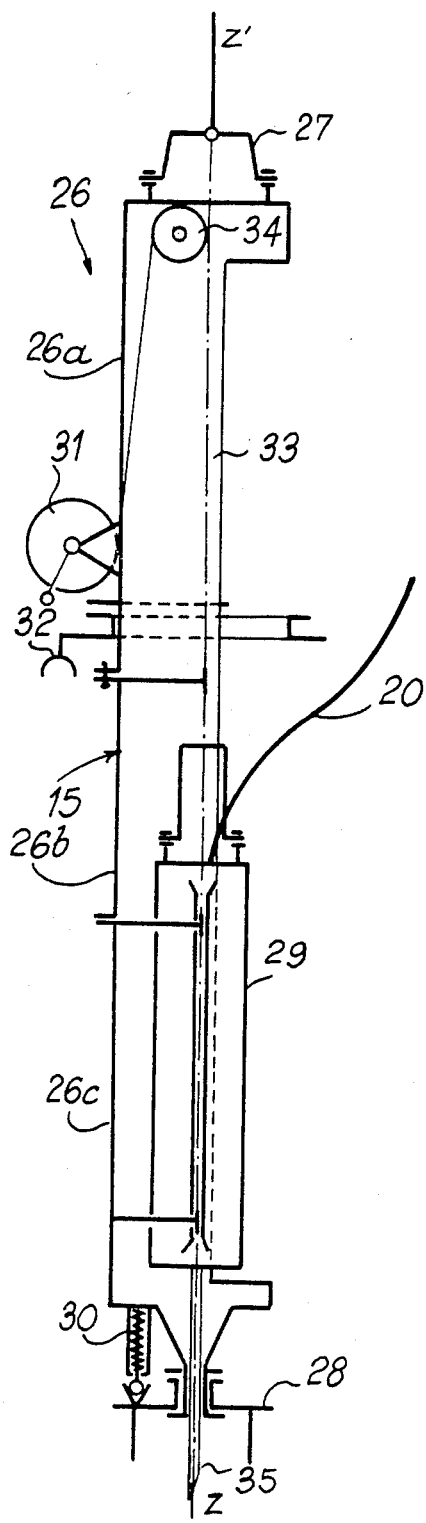
FIG. 3 is a diagrammatic view of the cleaning device as a whole.

FIG. 3 shows diagrammatically the device 15 as a whole, comprising a beam 26 in several portions 26a, 26b, 26c, a handle 27, a plate 28 for positioning it on the lower core plate 9, and a housing 29 movable vertically within the beam 26.

The beam 26 is mounted so as to be rotatable about its rotatable axis Z-Z' on the handle 27, and the plate 28 is itself mounted so as to be rotatable about the axis Z-Z' on the lower part of the beam 26. A rotation-locking device 30 makes it possible to immobilize the plate 28 relative to the beam 26 in certain angular positions. An assembly of two winches 31, which are fastened by means of a support 32 to the wall of the platform 17 of the reactor fueling machine, makes it possible, by means of cables 33 and guide pulleys 34 fastened under the handle 27, to displace the housing 29 within the beam 26 in the vertical direction The support 32 of the pulleys 31 also makes it possible to retain the beam 26 laterally against swinging movements.

The housing 29 is extended vertically in its lower part by a needle 35 constituting the movable effluent recovery element which will be introduced into the inner bore of the sleeve 7.

Reference will now be made to FIGS. 4, 4a, 4b and 4c to describe in more detail the beam 26, its upper suspension element 27 and its lower positioning element 28 as well as the winches 31 and their support 32.

Figure 4:
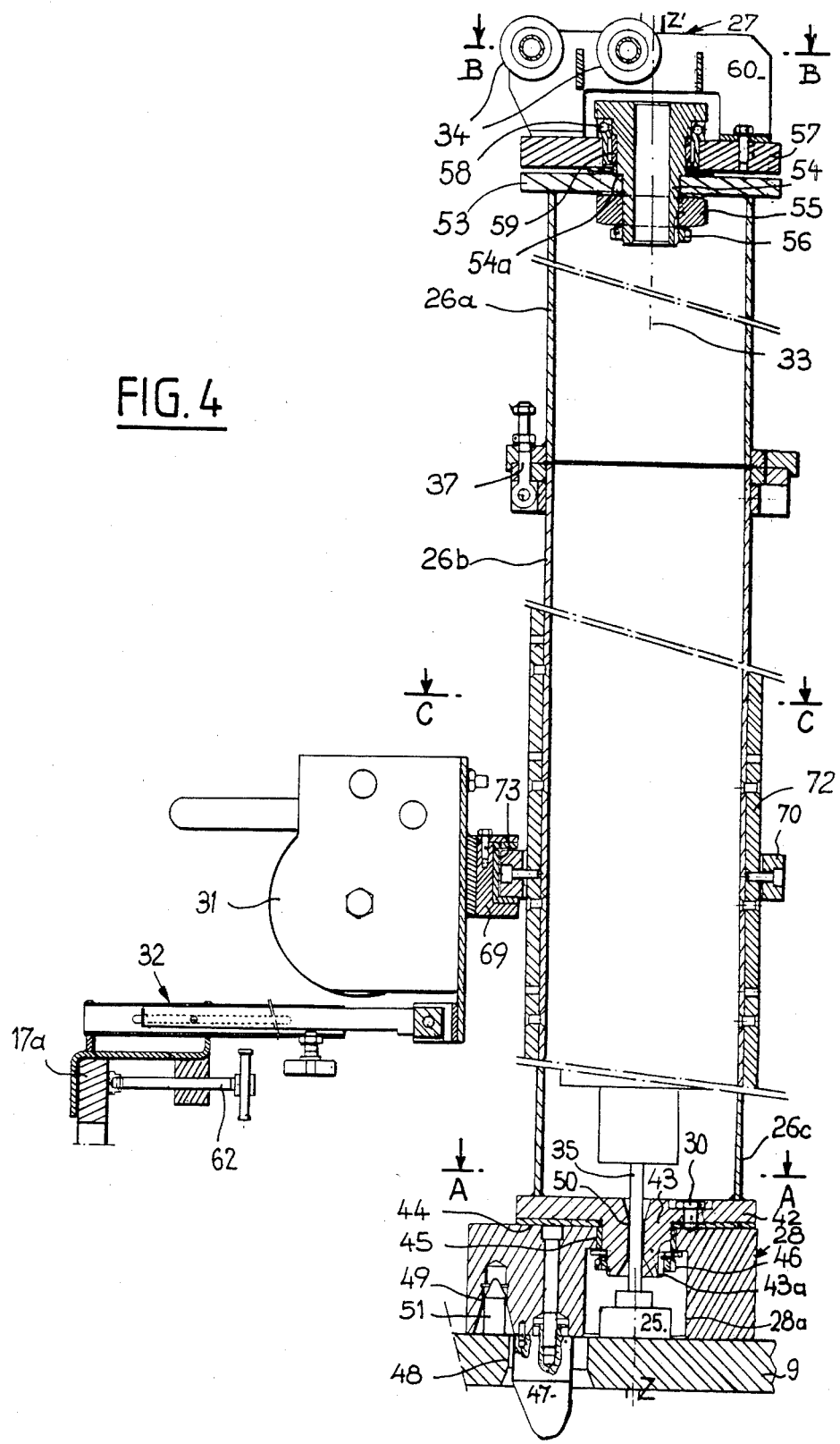
FIG. 4 is a partial vertical sectional view through the beam of the cleaning device.

In FIG. 4, only certain parts of the beam 26 have been shown, the other parts of this beam of very great length (of the order of 25 m in reactors in operation at the present time) having no characteristic details. The carriages shown diagrammatically in FIG. 3 have not been shown inside the beam 26 either.

The successive portions 26a, 26b and 26c of the beam are connected by means of an assembly of connections 37 comprising flanges, link pins threaded at their ends and nuts. The devices 37 make it possible to assemble or dismantle the various sections of the beam very quickly, in order respectively to install or extract it from the pool of the reactor.

Figure 4A:
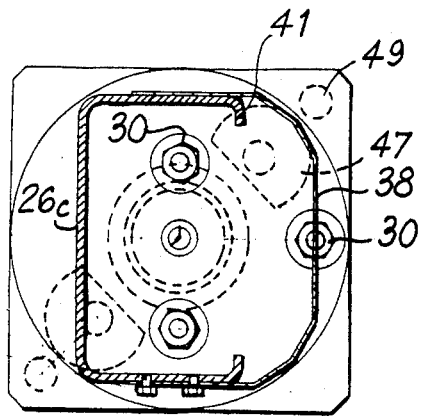
FIG. 4a is a sectional view along line A—A of FIG. 4.

The last portion 26c of the beam, the cross-section of which can be seen in FIG. 4a, is closed over its entire length by a cover 38, making it possible to prevent mechanical components, such as a bolt, from falling into the pool of the reactor. The length of this last portion 26c is such that its upper part incorporating means 37 of connecting it to the portion 26b is at a level higher than that of the highest part of the reactor partitioning 40, shown in FIG. 1, which forms part of the lower internal equipment of the reactor retained in the vessel during the operations of cleaning the guide tubes. The beam 26 has over its entire length turned-in edges 41 which can be seen in FIG. 4a and which form guide rails for the carriage 29, as will be explained below.

The lower part of the portion 26c of the beam 26 is welded to a circular base plate 42 having a cylindrical extension 43 threaded on its lower end part 43a. This base piece 42 is mounted rotatably in the plate 28 which has a central orifice 28a allowing the instrumentation guide piece 25 to pass and the extension 43 to be mounted in the plate 28 so as to be rotatable about the vertical axis Z-Z'. A washer 44 and an anti-friction ring 45 are interposed between the plate 28 and the base 42 to ensure sliding between these two components, and a nut 46 engaging with the thread 43a makes it possible to fasten the plate 28 on the base 42 and the beam 26.

The plate 28 carries two pre-centering studs 47 intended to engage in water passage orifices 48 passing through the lower core support plate 9 in vertical alignment with an assembly position. The plate 28 also has two centering holes 49 in positions corresponding to the positions of the centering studs 51 fastened to the upper face of the support plate 9 to receive an assembly. Finally, the base 42 has passing through it a calibrated orifice 50 which has frusto-conical guide ends for the guided passage of the needle 35 fixed to the carriage 29 moving within the beam 26 along its axis Z-Z'.

It will be understood that, when the effluent recovery device 15 is moved by means of the handling winch 16 from one assembly position receivjng flux-measuring means to another assembly position likewise receiving flux-measuring means, for the corresponding cleaning of the guide tubes, the pre-centering of the plate 28 fastened to the base of the beam 26 and then the centering and positioning of this plate are carried out as a result of the interaction of the elements 47, 48 and 49, 51. The beam 26 can subsequently be oriented accurately in relation to the plate 28, and the beam can be locked in rotation relative to the plate by means of the three locking devices 30 comprising a screw, a spring and a locking ball penetrating into a receptacle provided in the upper face of the plate 28.

The plate 28 must match the arrangement of the assembly-fastening means machined on the lower core plate 9. Two types of plate have been provided, one designed to fit the base-centering means for the assemblies of pressurized-water nuclear reactors with three loops and a power of 900 Mwe, and the others being designed to fit the base-centering means for the assemblies of pressurized-water nuclear reactors with four loops and a power of 1,300 Mwe.

Figure 4B:
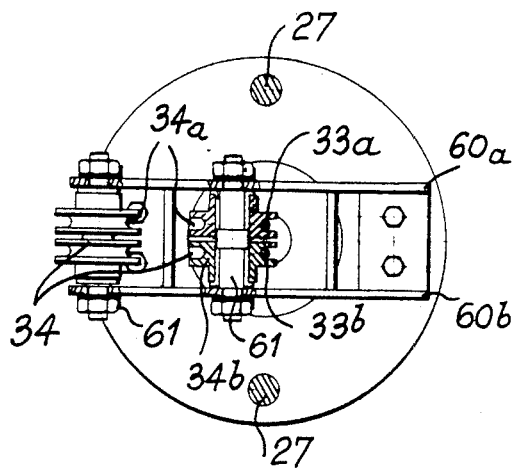
FIG. 4b is a sectional view along line B—B of FIG. 4.

The handling head of the beam 26, located in its upper part, will now be described with reference to FIGS. 4 and 4b. The upper portion 26a of the beam is connected in its upper part to a circular plate 53 perforated with a central orifice. In this orifice is mounted a hollow hub 54 fastened to the plate 53 by means of a nut 55 and a lock nut 56 engaging on a threaded part of the outer surface of the hub 54. The hub bears against the upper face of the plate 53 by means of a shoulder 54a. The suspension device consists of a handle 27 which is integral with a circular suspension plate 57 incorporating a central orifice, in which the axis Z-54 is mounted so as to be rotatable about the axis Z-Z' by means of a ball-bearing 58 and antifriction rings and washers 59. The beam 26 therefore comes up against the suspension plate 57, itself suspended from the handling means 16 via the handle 27, by means of the hub 54 bearing against the ball-bearing 58. Fastened to the upper face of the suspension plate 57 is a pulley support 60 consisting of two parallel vertical plates 60a and 60b (see FIG. 4b).

The guide pulleys 34 allowing the cables 33a and 33b, from which the housings are suspended, to return downwards are mounted in the support 60 by means of axles 61, on which the four pulleys 34 are mounted idly and independently. Two pulleys 34a serve for guiding the cable 33a displacing the housing 29 and two pulleys 34b serve for guiding the cable 33b controlling the second housing mounted movably within the housing 29.

Figure 4C:
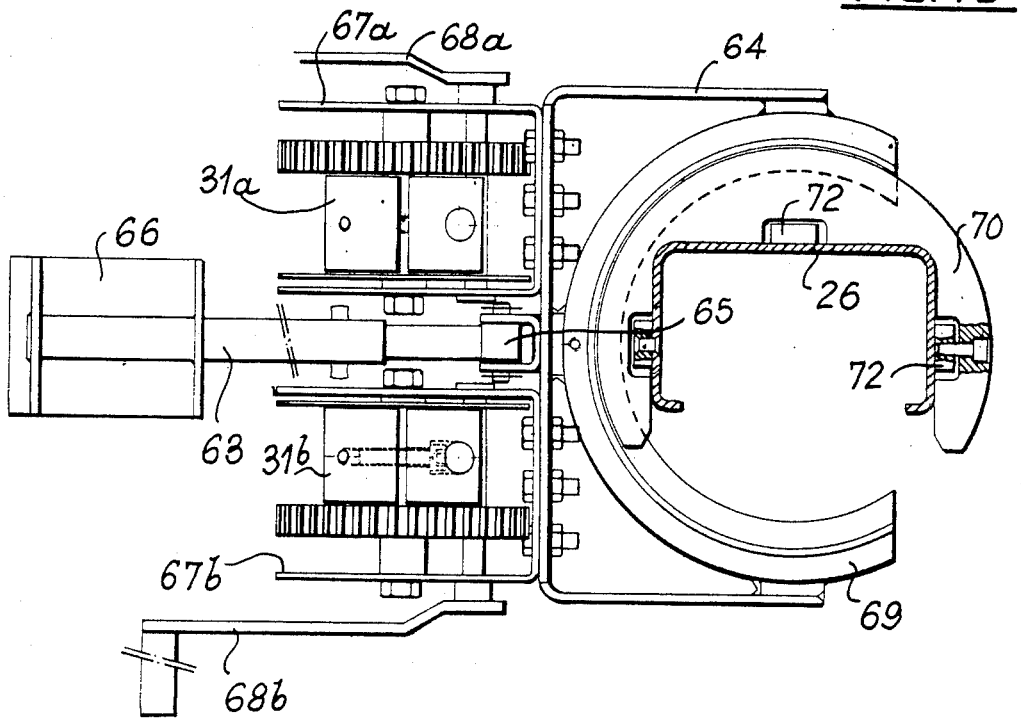
FIG. 4c is a sectional view along line C—C of FIG. 4.

Reference will now be made to FIGS. 4 and 4c to describe how the winches 31 are mounted in relation to the platform 17 and in relation to the beam 26.

The winch support 32 is fastened to the wall 17a of the platform 17 of the fueling machine by clamping by means of a key 62, when the plate 28 of the beam is positioned on the lower core plate 9, as shown in FIG. 4. The winches 31 are thus maintained in a fixed position relative to the platform 17, and the beam 26 of great length is maintained at the level of the winches in a position fixed in terms of translation in the horizontal plane.

However, the mounting of the winch support on the beam 26, as can be seen in FIGS. 4 and 4c, makes it possible to rotate the beam about its axis Z-Z' to displace the end of the offset needle 35 and introduce it into the bore of the passage sleeve, as will be explained below.

The support 32 comprises a fastening arm 63, a profile 66 for fastening the support 32 to the wall 17a and integral with one of the ends of the arms 63, and a support 64 in the shape of a wide-aperture U and fastened to the other end of the arm 63 by means of a joint 65. The shaped support 64 carries on its outer surface two winch supports 67a and 67b, in which the winches 31a and 31b are mounted respectively. The winches 31a and 31b are controlled manually and have cranks 68a and 68b for actuating them from the platform 17. The cables 33a and 33b of the winches follow a path inclined relative to the vertical between the winches 31 and the guide pulleys 34 and then a vertical path within the beam 26.

Fastened to the inside of the shaped support 64 by means of welding beads is a guide in the form of an annular sector and having a U-shaped groove 69. The beam 26 is fixed to a ring portion 70 by means of three fastening lugs 72. The fastening lugs 72 are secured by riveting to the faces of the beam 26.

The ring portion 70 is mounted rotatably within the guide piece 69, with an anti-friction rings and washers 73 being interposed.

The beam can consequently be maneuvered easily in rotation about its axis Z-Z' from the platform, the winches remaining completely stationary. The beam can therefore be placed very easily in an extremely accurate angular position because of the screw-and-ball indexing and locking means 30 arranged on the base 42 of the beam.

Figure 6A:
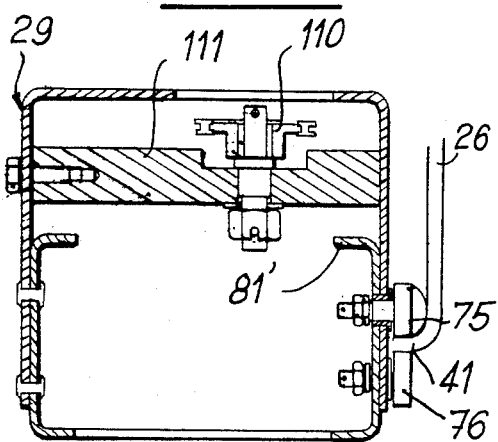
FIG. 6a is a sectional view along line D—D of FIG. 6.
Figure 6C:
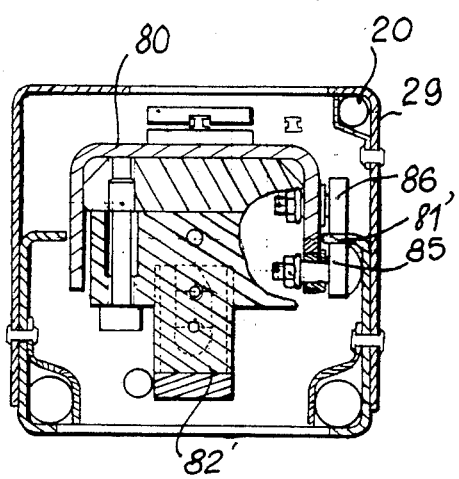
FIG. 6c is a sectional view along line E—E of FIG. 6.
Figure 6D:
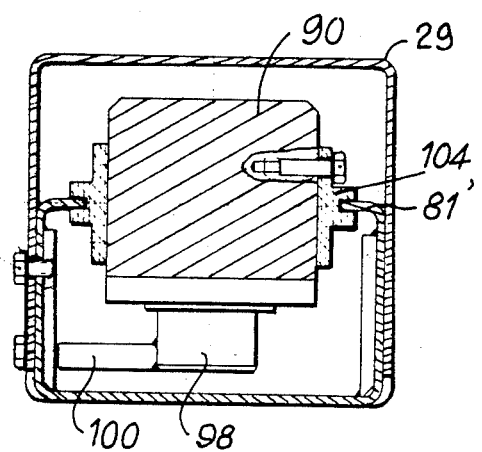
FIG. 6d is a sectional view along line F—F of FIG. 6.
Figure 6F:
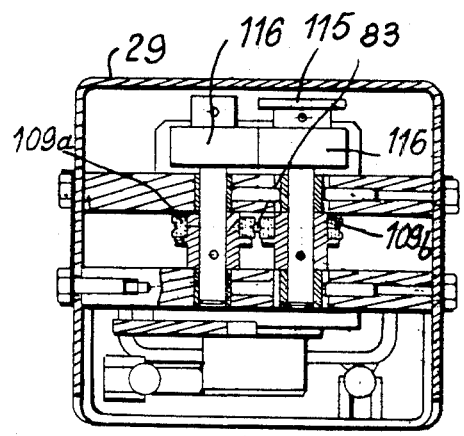
FIG. 6f is a sectional view along line G—G of FIG. 6.
Figure 5:
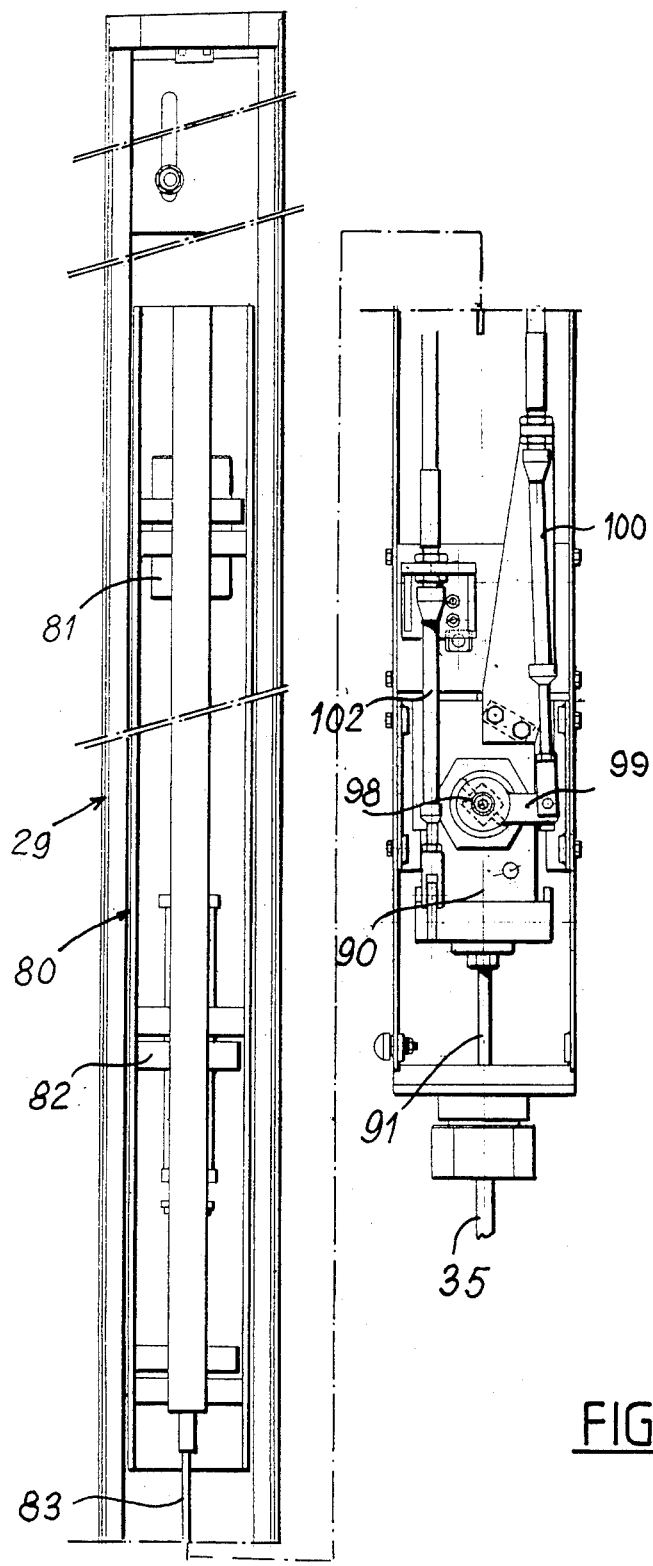
FIG. 5 is a side elevation view of the first housing and the second housing of the device.
Figure 6:
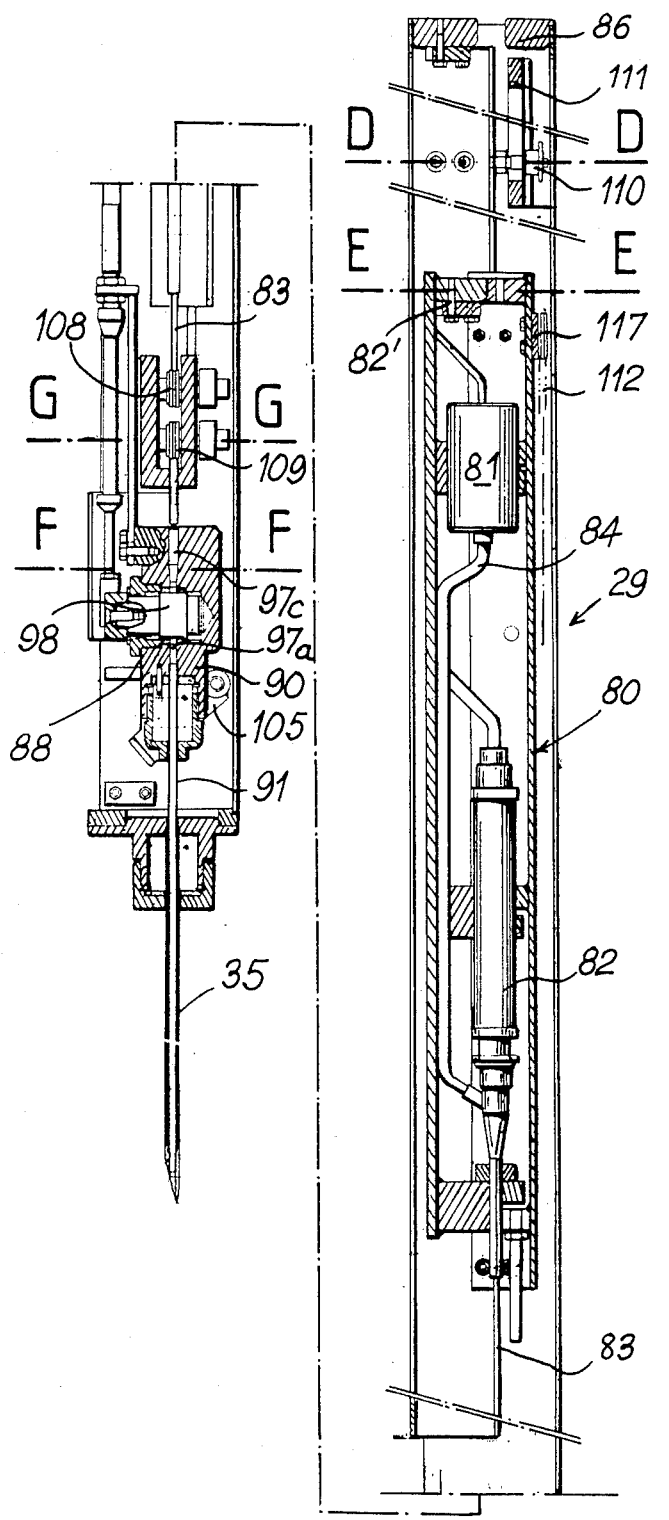
FIG. 6 is a sectional view in a vertical axial plane through the whole of the two housings shown in FIG. 5.

FIGS. 5 and 6 show the housing 29 as a whole, carrying in its lower part the offset-point needle 35. As can be seen in FIG. 6a, the housing 29 is produced in the form of a box girder as a result of two profiles being joined together, and carries sets of rollers 75,76 which interact with the guide part 41 of the beam 26 to guide the housing 29 in the direction Z-Z' within the beam 26.

As can be seen in FIGS. 5 and 6, the housing 29 contains a second housing 80, within which are fastened a light source 81, a television camera 82 and an optical fiber 83 which is illuminated by the source 81 via an optical duct 84 and which constitutes a fibroscope transmitting light images to the camera 82. The fibroscope 83 is arranged in the vertical axis common to the housings 29 and 80, i.e., in the axis of the bore of the needle 35.

As can be seen in FIG. 6c, the housing 80 consisting of a metal profile carries guide rollers 85 and 86 interacting with a plane guide part 81' provided on the inside of the housing 29. The housing 80 is therefore capable of moving in the vertical direction Z-Z' within the housing 29, the cable 33b controlling the movements of the housing 80 being fastened to the upper closing plate 82' of this housing 80.

The movement of the housing 80 within the housing 29 results in the insertion and movement of the fibroscope inside the hollow needle 35 or conversely in its extraction from the latter.

The housing 29 is itself fastened to the end of the cable 33a by means of its upper closing plate 86, with the result that its movement can be controlled from the platform 17 by means of the winch 31a. The movement of the housing 29 within the beam 26 makes it possible to move the hollow needle 35 in the direction Z-Z', to introduce and move it inside the instrumentation guide column, until the hollow needle can be inserted into the passage sleeve 7 positioned as an extension of the guide column.

In its lower part, the housing 29 contains the three-way valve 88, the body 90 of which forms in its lower part a receptacle for fastening the inner tube 91 of the hollow needle 35.

Figure 6B:
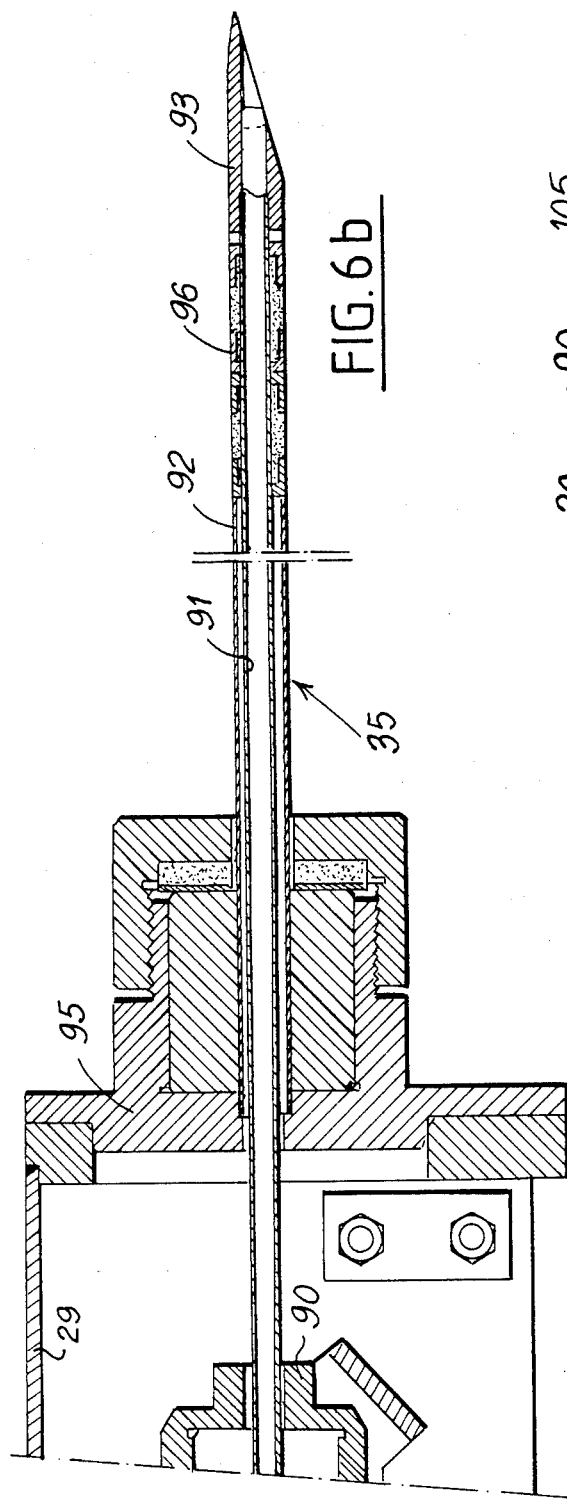
FIG. 6b is an enlarged view of the front part of the housing shown in FIG. 6, incorporating in particular a needle with an offset point.

As can be seen in FIG. 6b, the hollow needle 35 in fact comprises an inner tube 91, carrying at its end the offset point 93 of the needle, and an outer tube 92 fastened to the lower closing plate 95 of the housing 29. The outer tube 92 surrounds the inner tube 91 only over some of its length, the space remaining between the lower end of the tube 92 and the offset point 93 being occupied by gaskets 96 deformable under compression.

Within the valve body 90, the inner tube of the needle 91 communicates with one of the channels 97a of the valve 88 which is positioned as an extension of it, i.e. in the vertical direction. A second channel 97b perforated in the valve body, and not shown, communicates laterally with a flexible tube 20 arranged inside the housing 29 over its entire length so as to arrive at the three-way valve 88. Finally, the third channel 97c of the valve 88 is positioned as an extension of the channel 97a, so that it can receive the end of the fibroscope 83 during the movements of the housing 80 within the housing 29.

Figure 7A:
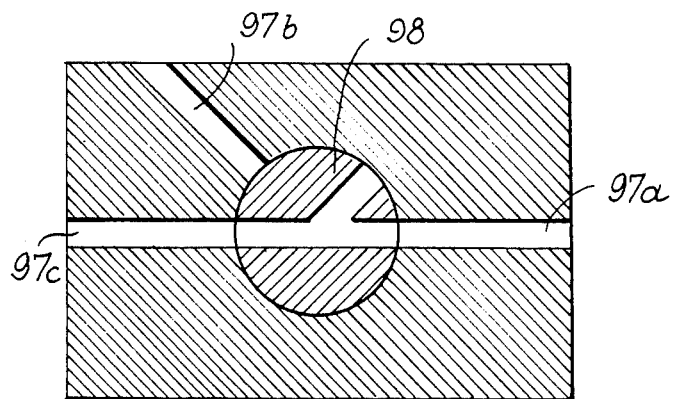
FIGS. 7a, 7b and 7c are diagrammatic views showing the three operating positions of the three-way valve.
Figure 7B:
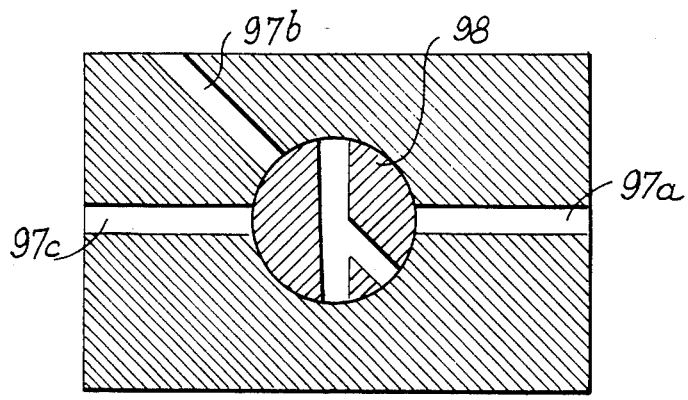
Figure 7C:
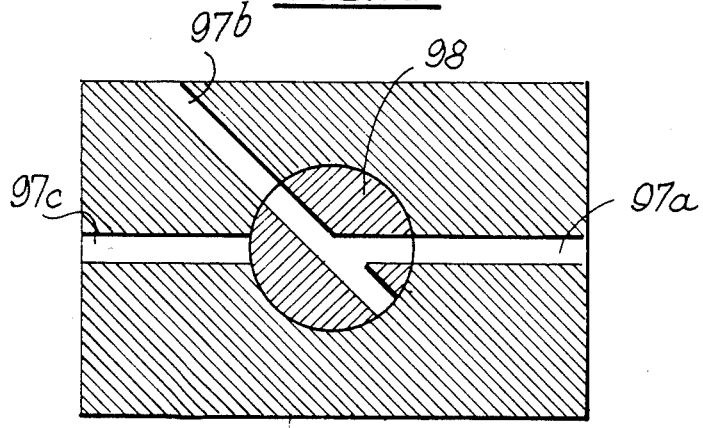

The rotary shutter 98 of the three-way valve 88 mounted so as to be rotatable about its axis in the valve body 90 is controlled in terms of its rotation by means of a linkage 100 articulated on a lever 99, making it possible to put it in one of the three positions shown in FIGS. 7a, 7b and 7c.

Moreover, a linkage 102 makes it possible to move the valve body 90 along the axis Z-Z' in one direction or the other, the valve body 90 being guided by means of slides 104 arranged laterally on the valve body 90, interacting with the guide parts 81' arranged on the inside of the housing 29 and also serving for guiding the second housing 80 containing the fibroscope.

Control cables which can be actuated from the platform 17 of the fueling machine take over from the linkages 100 and 102 controlling the shutter 98 and the displacement of the valve body 90.

The movement of the body 90 of the three-way valve causes the movement in the same direction of the inner tube 91 of the needle 35, this inner tube being integral with the valve body 90. The upward movement of the valve body consequently results in a movement in the same direction of the offset point 93 of the needle and in compression of the gaskets 96 which expand diametrically.

Figure 6E:
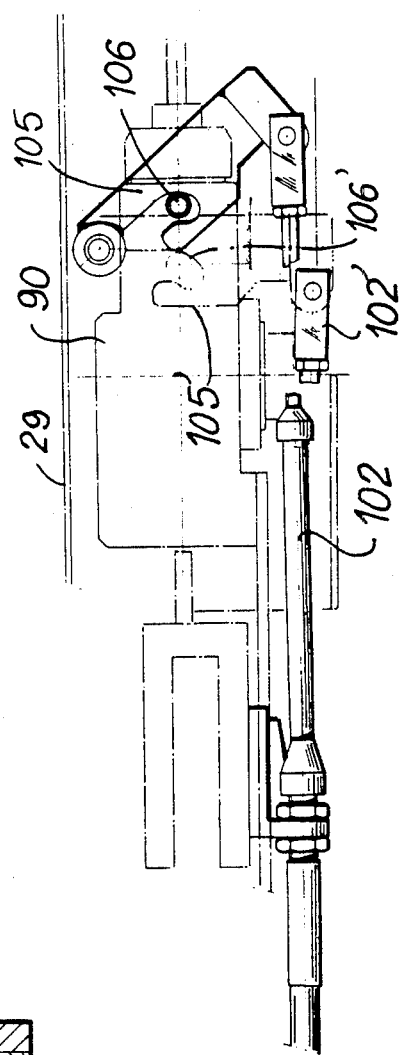
FIG. 6e is an enlarged side view of the front part of the first housing incorporating the three-way valve.

It will be seen in FIG. 6e that the valve body 90 can be placed in either of two positions by means of an actuating piece 105 acting on the valve body 90 via a pivot pin 106. The retracted position of the valve body 90 corresponding to the position 106' of the pivot pin 106 is obtained by pulling on the linkage 102. The actuating piece 105 articulated on the housing 29 then comes into the position 105'. This position corresponds to the expanded state of the gaskets 96 of the needle 35.

As can be seen in FIGS. 6 and 6f, the housing 29 also incorporates in its lower part, just above the three-way valve 88, two sets of two pulleys 108 and 109, between which the fibroscope 83 is gripped.

At the upper end of the housing 29, a chain pulley 110 is mounted inside a chain tightener 111. A chain 112 passes over the chain pulley 110 and, at the other end of the housing 29, over two chain pulleys 115, on the axles of which are mounted spur gears 116, making it possible to drive in rotation pulleys 109a and 109b, between which the fibroscope 83 is gripped, when the pulleys 115 are driven in rotation. This rotation of the pulleys 115 is caused as a result of the movement of the housing 80, the chain 112 being fixed to this housing 80 by means of a chain-gripping device 117 arranged laterally on the housing 80.

Consequently, during the movements of the housing 80 containing the fibroscope 83, the pulleys 109 constitute a pulling and pushing device allowing the fibroscope to be kept perfectly tensioned.

The deformation and jamming of the flexible fibroscope when it is introduced into the hollow needle 35 are avoided in this way.

FIGS. 7a, 7b and 7c show diagrammatically the three positions of the three-way valve 88.

The position I corresponding to FIG. 7a makes it possible to align the channels 97a and 97c with one another. In this position, the fibroscope 83 can be introduced into the inner tube 91 of the needle 35 up to the end 93 of the latter, when the housing 80 is lowered within the housing 29. The fibroscope 83 associated with the camera 82 then makes it possible to monitor, from the platform 17 where the camera cables arrive, the installation of the plate 28 on the lower core plate and the absence of any obstacle in the instrumentation guide column during the introduction of the needle 35, and when this needle 35 has been introduced into the instrumentation guide column up to a level located a little above the upper level of the passage sleeve 7, the fibroscope makes it possible to determine the orientation to be given to the offset needle 35 as a result of the rotation of the beam, to make it enter the inner bore of the passage sleeve 7.

The descent of the needle 35 within the instrumentation guide column and then in the bore of the sleeve 7 is thus monitored at every stage by the fibroscope. The downward movement of the needle 35 is obtained as a result of the movement of the housing 29 within the beam 26.

To avoid an incorrect maneuver, i.e., to avoid actuating the shutter 98 of the three-way valve so as to put it in the position shown in FIG. 7b or in FIG. 7c during the time when the fibroscope is in its inspection position within the needle 35, the remote control 100 of the shutter 98 is disengaged automatically when the fibroscope housing 80 leves its upper position to execute a descending movement causing the fibroscope to be introduced into the three-way valve and then into the needle 35. For this purpose, a position detector located in the housing 29 at the rear of the fibroscope housing 80 in its upper position is connected to the control for disengaging the linkage 100.

In its position II shown in FIG. 7b, the shutter 98 of the three-way valve blocks all communication between the channels 97a, 97b and 97c.

Finally, in its position III shown in FIG. 7c, the shutter 98 of the three-way valve puts the channel 97a communicating with the inner tube 91 of the needle 35 in communication with the channel 97b communicating with the flexible tube 20 connected to the effluent filtration unit.

The following is a brief description of a cleaning operation of a guide tube 5 of the nuclear reactor, using the waste recovery device 15 which has been described.

By means of the handling winch 16, the position of which in the horizontal plane is indexable, the beam 26 is brought into vertical alignment with an assembly position receiving the instrumentation tube. The lower plate 28 of the beam is lowered to a level 0.50 m above the lower core plate. The first housing 29 is in its retracted position, i.e., in its upper position.

The three-way valve is then set to its position I, and the fibroscope is introduced into the needle 35 by means of the manual winch 31b for moving the housing 80. When the fibroscope housing 80 has left its upper position, the three-way valve 88 is locked in the position I. The fibroscope housing 29 descends into its lowest position, the end of the fibroscope 83 then projecting slightly from the end of the needle 35 which is itself above the base 42. The winch 31b controlling the fibroscope housing is disengaged, and the housing 29 is lowered by means of the manual winch 31a, until the end of the needle 35 is in a position very slightly retracted in relation to the installation face of the plate 28 on the lower core plate 9. The beam 26 is then lowered by means of the handling winch 16, and the plate 28 is placed on the lower core plate, these maneuvers being monitored by means of the fibroscope and the camera. The housing 29 and the needle 35 then continue to be lowered, and the needle penetrates into the instrumentation column via the guide piece 25. During this entire descent, the fibroscope 83 makes it possible to check that there is no obstacle to the displacement of the needle 35 in this instrumentation guide column.

The descent of the housing 29 and the needle 35 in the beam 26 is stopped when the point 93 of the needle 35 has reached a point 5 cm above the upper level of the penetration sleeve 7.

The offset head 93 of the needle 35 is then oriented as a result of the rotation of the beam 26 controlled from the platform, in such a way that the offset point of the needle is as near as possible to the axis of penetration of the sleeve 7. This maneuvre makes it possible, in particular, to ensure good penetration of the needle, even if the sleeve is appreciably out of alignment with the guide column. The fibroscope 83 is then retracted a few centimeters, and the needle 35 is introduced approximately 10 cm into the sleeve 7. The diametral compression and expansion of the gaskets 96 of the needle are then obtained when the body 90 of the three-way valve is raised to put it into its upper position 90′. A check is made to ensure that the gaskets 96 provide a proper leakproof closure between the needle and the inner bore of the sleeve 7.

The fibroscope 83 is extracted, and when the fibroscope housing 80 arrives in the upper position, the three-way valve is released. This three-way valve 88 is then put in the position II, after which the injection tap 19 is opened, and then the pump 18 for injecting demineralized water into the corresponding guide tube is connected up in the instrumentation room 4. The three-way valve 88 is put into its position III, and then demineralized water is injected into the guide tube, with the result that the flexible tube 20 can carry the waste towards the filtration station 21. Injection is continued to ensure complete cleaning of the guide tube 5 and of the glove finger 6. The valve is then put into the closing position II, the injection pump 18 is disconnected, and the injection tap 19 is closed again.

The three-way valve is returned to the position I, and the fibroscope 83 is introduced into the needle 35, being left set back a few centimeters from the end 93 of the needle. The three-way valve 88 is then locked in the position I. The gaskets 96 are decompressed and the stroke of the three-way valve 88 is monitored.

The winch 31b for displacing the fibroscope is disengaged, and the housing 29 is raised until the offset point 93 and the needle 35 are level with the plate 28.

The beam 26 is returned to its initial position relative to the plate 28 as a result of rotation, and this beam is raised 0.50 m above the lower core plate 9.

By means of the handling device 16, the beam is brought into place above a second assembly position where instrumentation is located.

It will be seen that the device according to the invention has the advantage of making it possible to clean the instrumentation guide tubes, with the radioactive effluent being recovered at the outlet of the passage sleeves in the vessel bottom, without extracting the lower internal equipment from the reactor vessel, thus providing many advantages and considerably reducing the length and cost of the operation.

The invention is not limited to the embodiment described. Thus, it is possible to use alternative embodiments of the various elements constituting the device for recovering effluent at the outlet of the passage sleeves.

It is also possible to use optical television monitoring devices using a fibroscope and television camera, which are different from that described.

Finally, the cleaning device according to the invention can be used in all pressurized-water nuclear reactors incorporating guide tubes for the means of measuring neutron flux in the core.

We claim:

1. Device for cleaning the guide tubes (5) of the means for measuring neutron flux in a pressurized-water nuclear reactor at shutdown, said reactor comprising a vessel (1) containing internal equipment (9, 40) supporting and retaining fuel assemblies of a core or lower internal equipment arranged above a convex vessel bottom (2) and comprising, in particular, a horizontal core support plate (9), a reactor pool (10) communicating with the inner volume of said vessel (1), the assembly as a whole being filled with water, a fueling machine movable above said pool (10) in a horizontal plane and comprising, in particular, a platform (17) and a winch (16) for handling in the vertical direction, capable of coming into vertical alignment with all the points on said convex bottom (2), a containment containing said pool and said vessel (1) within a vessel well (3), and an instrumentation room (4) arranged laterally in relation to said vessel well (3) and into which enters one of the ends of said guide tubes (5), each connecting said instrumentation room (4) along a path incorporating a bend (5a) to the inner volume of said vessel (1), into which said guide tube (5) opens via a vertical sleeve (7) passing through said vessel bottom (2) in alignment with a guide column (24), the central guide duct of which opens onto the upper face of said core support plate (9) at the level of a passage corresponding to a position of entry of the flux-measuring means into an assembly, said cleaning device comprising means (18, 19) for injecting demineralized water into each of said guide tubes (5) located in said instrumentation room (4) and means (15, 20, 21, 22) of recovering the water laden with radioactive particles at the outlet of said vertical sleeve (7), comprising a flexible tube (20) connected to a filtration station (21) located above said fuel pool, wherein, in order to install said recovery means and recover the radioactive particles without extracting said internal equipment (9, 40) from said reactor vessel (1), from which only said upper internal equipment and said core assemblies have been extracted, said recovery means comprise (a) a hollow structural beam (26) suspended vertically via its upper part from said handling winch (16) by means of a suspension element (27, 57), on which said beam (26) is mounted so as to be rotatable about its vertical axis (Z-Z');

(b) a fastening plate (28) mounted on the lower end of said beam (26) rotatable about the vertical axis (Z-Z') of said beam (26) and having positioning means (47, 49) interacting with positioning means (48, 51) corresponding to an assembly provided on said core support plate (9) and means (30) of locking said beam (26) in fixed angular positions on said plate (28);

(c) a first housing (29) mounted so as to be movable in said beam (26) in its axial direction and carrying a hollow needle (35) with a point offset axially (93) at its lower end, said needle being provided with deformable gaskets (96) on its outer surface;

(d) a three-way valve (88) having a body (90), one channel of which valve communicates with the inner space of said needle (35), a second channel (97b) of which communicates with said flexible tube (20), and a third channel (97c) of which is an extension of said first channel (97a);

(e) a second housing (80) carrying a light source (81), a fibroscope (83) and a television camera (82) and movable in said first housing (29) above said three-way valve, for introducing said fibroscope (83) and displacing it in said hollow needle (35) by means of said three-way valve (88);

(f) two winches (31a, 31b) controlling the axial displacement of said housings (29, 80), each associated with a housing and fastened to said platform (17) of said fueling machine by means of a support (32), in which said beam (26) is mounted so as to be rotatable about its vertical axis (Z-Z'); and (g) display and control means located on said platform (17) of said fueling machine for the controlled introduction of said needle (35) into the bore of said sleeve (7).

2. Cleaning device according to claim 1, wherein said hollow needle (35) consists of two coaxial tubes (91, 92), namely, an inner tube (91) carrying an offset point (93) at its lower end and fastened to said body (90) of said three-way valve (88), which is mounted so as to be movable in the vertical direction Z-Z' within said first housing (29), and an outer tube (92) integral with said housing (29) and having its lower end above said offset point (93) which slightly projects radially from said inner tube (91), said deformable gaskets (96) being interposed between the lower end of said outer tube (92) and said offset point (93), such that the displacement of said valve body (90) in the upward direction causes diametral compression and expansion of said gaskets (96).

3. Cleaning device according to claim 1 or 2, wherein said fibroscope (83), between its emergence from said second housing (80) and said three-way valve (88), is engaged between two sets of pulleys (109a, 109b) which grip it and which are connected to said second housing (80) by means of a kinematic assembly comprising pulleys (110, 115), gears (116) and a chain (112), such that said pulleys (109a, 109b) gripping said fibroscope (83) are driven in rotation so as to exert a pull or a push on said fibroscope (83) during displacements of said second housing (80) and said fibroscope in one direction or the other within said hollow needle (35).

4. Cleaning device according to claim 1 or 2, wherein said three-way valve (88) has a shutter (98) controlled by a control assembly (100) so that said valve passes from one opening or closing position to another, one of the opening positions or first position being that in which said first channel (97a) and said third channel (97c) are placed in communication with one another for passage of said fibroscope (83) and for introducing it into said hollow needle (35), and wherein said control assembly (100) is subject to a detector which detects the position of said second housing (80) and which is located in said first housing (29), such that said shutter can be actuated only when said second housing (80) is in its highest position within said first housing (29).

* * * * *